United States Patent
Huang et al.

(10) Patent No.: US 12,492,131 B2
(45) Date of Patent: Dec. 9, 2025

(54) METHOD OF OPTIMIZING RECOMMENDED COAGULATION OPERATING PARAMETERS FOR WATER TREATMENT

(71) Applicant: National Central University, Taoyuan (TW)

(72) Inventors: Chih-Yuan Huang, Taoyuan (TW); Yi-Yun Chen, Taoyuan (TW)

(73) Assignee: National Central University, Taoyuan (TW)

( * ) Notice: Subject to any disclaimer, the term of this patent is extended or adjusted under 35 U.S.C. 154(b) by 398 days.

(21) Appl. No.: 18/201,863

(22) Filed: May 25, 2023

(65) Prior Publication Data
US 2024/0343608 A1 Oct. 17, 2024

(51) Int. Cl.
| | |
|---|---|
| C02F 1/00 | (2023.01) |
| B01D 21/30 | (2006.01) |
| C02F 1/52 | (2023.01) |
| G01N 1/40 | (2006.01) |
| G06N 3/08 | (2023.01) |
| G06N 3/084 | (2023.01) |

(52) U.S. Cl.
CPC ............ *C02F 1/008* (2013.01); *B01D 21/30* (2013.01); *C02F 1/52* (2013.01); *G01N 1/40* (2013.01);
(Continued)

(58) Field of Classification Search
CPC ........ C02F 1/008; C02F 1/52; C02F 2209/02; C02F 2209/06; C02F 2209/11;
(Continued)

(56) References Cited

U.S. PATENT DOCUMENTS 6,408,227 B1 * 6/2002 Singhvi ................ G05B 13/027
  700/32
2006/0160227 A1 * 7/2006 Sethumadhavan ... C02F 1/5209
  436/56
(Continued)

FOREIGN PATENT DOCUMENTS

| CN | 115010232 A | 9/2022 | |
| JP | 2006122749 A * | 5/2006 | ............ B01D 21/30 |

(Continued)

OTHER PUBLICATIONS

English translation of JP_2006122749, May 18, 2006. (Year: 2006).*
(Continued)

*Primary Examiner* — Joseph W Drodge
(74) *Attorney, Agent, or Firm* — Demian K. Jackson; Jackson IPG PLLC

(57) ABSTRACT

The present invention is to optimize recommended coagulation operating parameters for water treatment. The optimization is aimed to apply Artificial Intelligence of Things for optimizing coagulation procedure with energy saved and cost reduced. The optimizing of the coagulation procedure is that the training data, such as water quality conditions, coagulant dosages, mixing speeds, etc., are used to estimate corresponding turbidity changes; and, after considering the drinking water standards and the cost of drug and energy, optimized operating parameters are found. The result shows that the accuracy of multiple nonlinear regression is high, where the root mean square difference for turbidity is 1.57 nephelometric turbidity units. In overall, the optimized coagulation procedure accurately estimates coagulation-related operating parameters based on changes in water quality.

9 Claims, 13 Drawing Sheets

(52) U.S. Cl.
CPC .......... *G06N 3/084* (2013.01); *C02F 2209/02* (2013.01); *C02F 2209/06* (2013.01); *C02F 2209/11* (2013.01); *G01N 2001/4083* (2013.01)

(58) Field of Classification Search
CPC .......... C02F 2209/001; C02F 2209/006; C02F 1/5209; C02F 1/5245; C02F 1/56; C02F 1/66; G06N 3/084; B01D 21/30; B01D 21/01; B01D 21/34; G01N 1/40; G01N 2001/4083; G01N 33/18
See application file for complete search history.

(56) References Cited

U.S. PATENT DOCUMENTS

| | | | |
|---|---|---|---|
| 2020/0231466 A1* | 7/2020 | Lu | G01N 33/18 |
| 2022/0015638 A1 | 1/2022 | Zeng et al. | |

FOREIGN PATENT DOCUMENTS

| | | | | | |
|---|---|---|---|---|---|
| JP | 2014065030 | A | * | 4/2014 | B01D 21/30 |
| JP | 6330085 | B1 | * | 5/2018 | B01D 21/30 |
| JP | 2021146246 | A | * | 9/2021 | B01D 21/30 |

OTHER PUBLICATIONS

English translation of JP_2014065030, Apr. 17, 2014. (Year: 2014).*
English translation of JP_6330085, May 23, 2018. (Year: 2018).*
English translation of JP_2021146246, Sep. 27, 2021. (Year: 2021).*
Kang Shifang et al., "Research on the Operational Optimization of Drinking Water Treatment Systems", (自來水處理系統操作最佳化之研究) Chinese Taipei Water Works Association, Jun. 1999.
Xiaoyan Deng and Canguang Lin, "Application of ELM to predict the coagulant dosing in water treatment plants" Water Science & Technology: Water Supply | 17.4 | 2017 http://iwaponline.com/ws/article-pdf/17/4/1053/409230/ws017041053.pdf.
Santos et al., "Intelligent system for improving dosage control" Acta Scientiarum. Technology, Maringá, v. 39, n. 1, p. 33-38, Jan.-Mar. 2017.
M. Hassen Baouab and Semia Cherif, "Prediction of the optimal dose of coagulant for various potable water treatment processes through artificial neural network" Journal of Hydroinformatics | 20.6 | 2018 http://iwaponline.com/jh/article-pdf/20/6/1215/505678/jh0201215.pdf.
"Progress on sanitation and drinking-water—2013 update." WHO Library Cataloguing-in-Publication Data.

* cited by examiner

METHOD OF OPTIMIZING RECOMMENDED COAGULATION OPERATING PARAMETERS FOR WATER TREATMENT

TECHNICAL FIELD OF THE INVENTION

The present invention relates to method of optimizing recommended coagulation operating parameters for water treatment; more particularly, to saving energy and reducing the cost of drug dosage, where, from the perspective of improving water purification efficiency, models of artificial neural network (ANN) and regression are used to develop an optimized coagulation procedure for predicting appropriate coagulant dosage and stirring speed.

DESCRIPTION OF THE RELATED ARTS

According to the World Health Organization, water is one of the essential elements for life. Water purification plant is an important infrastructure for providing people with tap water. In the complex procedure of the water purification plant, coagulation is the first procedure in water purification procedure, which is particularly important. In most of the water purification plants at present, the operating parameters for coagulation are mostly based on water-quality monitoring data and regular jar tests to adjust dosages. Then, the operators in the water purification plant judge the actual operating parameters based on subjective experiences. Yet, during water treatment, data of raw-water quality are highly variable and dynamically changing, which have complex and non-linear relationships between water qualities and operating parameters. If the dosages were to be adjusted according to different water conditions in real time, manpower burden would be increased. Therefore, during current methods, it is difficult to adjust actual operating parameters based on objective factors in real time, as it may lead to a decrease in coagulation efficiency, result in poor sedimentation efficiency, and increase burden on fast filtering. The above coagulation situations make it difficult to adjust the operating parameters of water treatment in real time and affect water treatment efficiency while increasing the cost of energy, drug, and personnel expense.

Many studies have shown that models of neural network and regression can be used to predict coagulant dosage (Kang Shifang et al., 1999; Deng & Lin, 2017; Santos et al., 2017; Baouab et al., 2018). The efficiency of water purification is improved and automatic monitoring is achieved to respond with appropriate coagulant dosages in real time. Yet, discussion on optimized coagulation procedure is still lacking. However, most of the previous researches on coagulation are focused on controlling coagulant dosages; but there are few considering stirring speed at the same time (the G value of the equipment engineering standard of tap-water-supply facility is 10-75). Nevertheless, in coagulation, in addition to controlling the coagulant dosages, the stirring speed is also one of the factors affecting the efficiency. Therefore, it is necessary to consider the coagulant dosages and the stirring speed at the same time.

There is a fact that most of the previous researches used historical data for model training. Although the operators can use the data for judgment and decision-making, but may not fit for obtaining the best operating parameters with lowest cost. The reason is that historical data come from subjective experiences of the operators. Personal subjective experiences may lead to unstable water treatment and unnecessary expense of dosage and energy. It is necessary to precisely control dosages and stirring speed for fully enhancing water purification efficiency and solving the problem of cost of drug and energy. Hence, the prior arts do not fulfill all user's requests on actual use.

SUMMARY OF THE INVENTION

The main purpose of the present invention is to save energy and reduce the cost of drug dosage, where, from the perspective of improving water purification efficiency, algorithms of Back Propagation Neural Network, Extreme Learning Machines, Multiple Linear Regression, and Multiple Nonlinear Regression are used to design and develop an optimized coagulation procedure.

Another purpose of the present invention is to apply Artificial Intelligence of Things (AIoT) for optimizing the coagulation procedure, where training data, such as water quality conditions, coagulant dosages, mixing speeds, etc., are used to estimate corresponding turbidity changes through AI and statistical models; and, after considering the drinking water standards and the cost of drug and energy, optimized operating parameters are obtained.

To achieve the above purposes, the present invention is a method of optimizing recommended coagulation operating parameters for water treatment, comprising steps of: (a) training step: collecting coagulation data through a jar test; using the collected coagulation data, comprising water conditions and coagulation operating parameters, as training data of a plurality of models of ANN and regression to estimate turbidity changes under different values of the water conditions and the coagulation operating parameters; the water conditions comprise a raw turbidity, a raw pH, and a temperature; and the coagulation operating parameters comprise a coagulant dosage and a stirring speed; and (b) applying step: inputting values of the water conditions, a set value of the coagulant dosage, and a set value of the stirring speed into the models of ANN and regression obtained after being trained in step (a) to estimate a turbidity change and subtract the turbidity change from the raw turbidity of the water conditions to judge that, on meeting an operating specification, the coagulant dosage and the stirring speed together having the lowest cost are predicted to be the best of the coagulation operating parameters; and, through comparing the models of ANN and regression, a recommended model of the coagulation operating parameters is selected from the models of ANN and regression. Accordingly, a novel method of optimizing recommended coagulation operating parameters for water treatment is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

Figure 1:
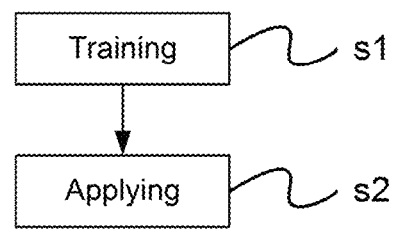
FIG. 1 is the flow view showing the preferred embodiment according to the present invention.

The following description of the preferred embodiment is provided to understand the features and the structures of the present invention.

Please refer to FIG. 1~FIG. 5D, which are a view showing a preferred embodiment according to the present invention; a view showing a jar test; a view showing relationships of data of the jar test with a first raw turbidity; a view showing relationships of data of the jar test with a second raw turbidity; a view showing relationships of data of the jar test with a third raw turbidity; a view showing loss curves of a model of BPNN; a view showing loss curves of a model of ELM; a view showing loss curves of a model of MLR; a view showing loss curves of a model of MNR; a view showing validation results of BPNN; a view showing validation results of ELM; a view showing validation results of MLR; and a view showing validation results of MNR. As shown in the figures, the present invention is a method of optimizing recommended coagulation operating parameters for water treatment, where, regarding coagulant dosage and stirring speed under the constant changes of water quality, the operating parameters are dynamically updated accordingly. Hence, the present invention develops an optimized coagulation procedure, comprising the following steps:

(a) Training s1: Coagulation data are collected through a jar test. The collected coagulation data comprise water conditions and coagulation operating parameters; and are used as training data of a plurality of models of artificial neural network (ANN) and regression to estimate turbidity changes under the different water conditions and the coagulation operating parameters. Therein, the turbidity change is a difference between raw turbidity and turbidity of sedimented water; the water conditions comprise a raw turbidity, a raw pH, and a temperature; and the coagulation operating parameters comprise a coagulant dosage and a stirring speed.

(b) Applying s2: Values of said water conditions, a set value of the coagulant dosage, and a set value of the stirring speed are inputted into the models of ANN and regression obtained after being trained in step (a) to estimate a turbidity change and subtract the turbidity change from the raw turbidity of the water conditions to judge that, on meeting an operating specification, the coagulant dosage and the stirring speed together having the lowest cost are predicted to be the best of the coagulation operating parameters; and, through comparing the models of ANN and regression, a recommended model of the coagulation operating parameters is selected from the models of ANN and regression. Therein, the operating specification is that the turbidity of a supernatant part of any of the sedimented waters is required to be less than 5 nephelometric turbidity unit (NTU). Thus, a novel method of optimizing recommended coagulation operating parameters for water treatment is obtained.

In a state-of-use, the coagulation data collected in the jar test in step (a) comprises 10 raw turbidities of 10~100 NTU with an interval of 10 NTU thereof, 5 stirring speeds of 20~60 rounds per minute (rpm) with an interval of 10 rpm thereof, and 12 coagulant dosages of 0.1~50 parts per million (ppm) of concentrations to obtain a total of 1200 sets of the coagulation data. Therein, for making the training data generalized and wholesome enough, the present invention prepares raw waters with different turbidities for jar test to simulate a variety of water qualities; and the deployment method is to obtain sediment from a weir and add it to the raw waters for forming different turbidities.

Figure 2:
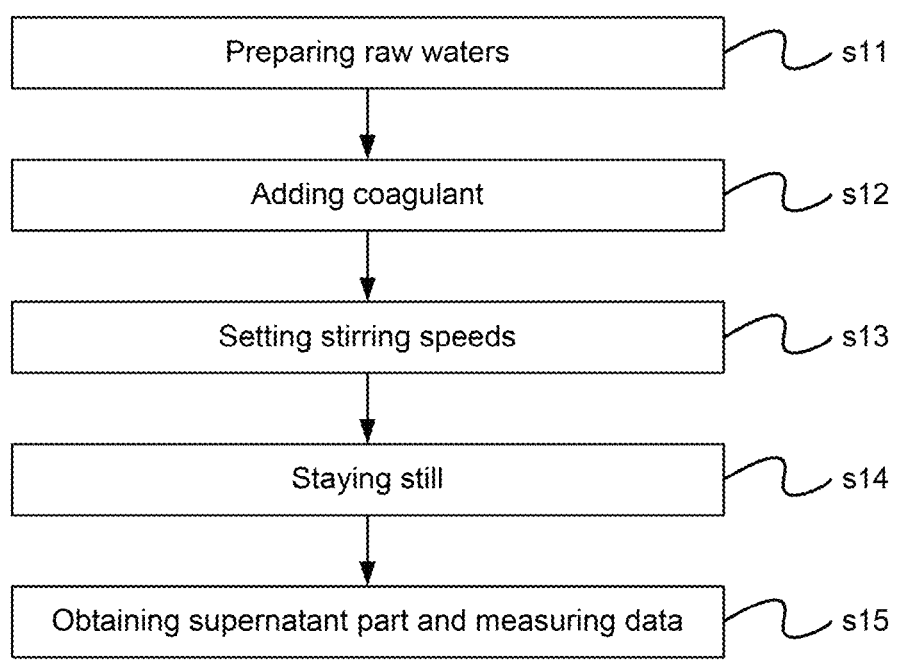
FIG. 2 is the flow view showing the jar test.

In a state-of-use, in step (a), the jar test comprises the following sub-steps, as shown in FIG. 2:

(a1) Preparing raw waters s11: A plurality of raw waters with different turbidities are prepared. The water conditions of the raw waters are measured, comprising raw turbidities, raw pHs, and temperatures. The prepared raw waters with the different turbidities are loaded into 12 beakers of 1000 milliliters.

(a2) Adding coagulant s12: A coagulant is added in, where the coagulant is polyaluminum chloride and ferric chloride.

(a3) Setting stirring speeds s13: A plurality of stirring speeds for different mixings, comprising fast and slow mixings, are set, where a stirring speed of 150 rpm per 3 minutes and 30 seconds is set for fast mixing; and stirring speeds of 20~60 rpm per 41 minutes are set for slow mixing.

(a4) Staying still s14: Flocs are sedimented to the bottoms of the beakers by staying still.

(a5) Obtaining supernatant part and measuring data s15: A plurality of supernatant parts of 30 milliliters at a position about 2 centimeters below the liquid surface of each of the sedimented waters obtained after step (a4) are taken to measure and record a turbidity, a pH, and a temperature of the supernatant part.

In a state-of-use, step (b) is to obtain a plurality of the set values of coagulant dose and stirring speed through simulation in an application program. In this state-of-use, five groups of different initial set values are prepared and set. Then, the coagulation operating parameters with the lowest cost is approached through adjustment from the set values having lower cost, while the converging spacing of the set values is the difference between the set values changed in the adjustment.

In a state-of-use, in step (b), after judging that the operating specification is met, a judgement of a spacing of the set values is further made, which is a spacing of the set values of the coagulant dose is required to be less than 0.1 ppm or that of said stirring speed is required to be less than 0.1 rpm, to obtain the best coagulation operating parameters.

In a state-of-use, before analyzing and calculating, it is necessary to process data, like filtering, integrating, and transforming them, at first, for avoiding problems, like data missing, noise, and outliers, resulting in misjudgment. The present invention processes pretreatment to the data before training the models, where the pretreatment includes regularization, generalization, and understanding the relationship between jar-test stirring speeds and real-field velocity gradient.

<Regularization>

On training the models, different units may be used; or, the representativeness of magnitude and change in value may be different to further affect analysis result. Therefore, regularization is needed to solve the problem. The normalization processed in the present invention is that of minimum value and maximum value, as shown in Formula (1) and Formula (2), where each parameter is set with an appropriate range to maintain the overall ratio of the parameters in principle. Therein, the coagulation data collected in the jar test comprises 0~100 NTU of raw turbidities, 0~14 of raw pHs, 0~50 ppm of doses of polyaluminum chloride, 0~6 ppm of doses of ferric chloride, and 20~60 rpm of stirring speeds for slow mixing.

$$X_{nom} = \frac{X - X_{min}}{X_{max} - X_{min}} \quad (1)$$

$$Y_{nom} = \frac{Y - Y_{min}}{Y_{max} - Y_{min}} \quad (2)$$

Therein, X is the observed value of inputted parameter; $X_{nom}$ is the normalized value of inputted parameter; $X_{min}$ is the minimum value of inputted parameter; $X_{max}$ is the maximum value of inputted parameter; Y is the observed value of inputted parameter; $Y_{nom}$ is the normalized value of outputted parameter; $Y_{min}$ is the minimum value of outputted parameter; and $Y_{max}$ is the maximum value of outputted parameter.

<Relationship Between Jar-Test Stirring Speeds and Real-Field Velocity Gradient>

For collecting data of various stirring speeds, the present invention collects the data through the jar test. However, the jar test uses a relatively simple stirring device, which has a certain gap with the real-field coagulation unit. Therefore, the stirring speeds of the jar test are converted into the stirring speeds used in actual factory through mathematical formulas. Coagulation mostly uses paddles as agitators. The paddle-type floc-device and the jar-test device have powers (P) consumed by stirring in liquid, where P is derived through Formula (3), a Newtonian mechanics formula; Formula (5) is obtained through Formula (4); Formula (6) and Formula (7) are substituted into Formula (5) to get Formula (8). The jar-test device and and the real-field agitators process conversion through an equal treatment of Gt value, i.e. the Gt value at the real field is equal to that of the jar test. Therefore, through Formula (9), Formula (8), and Formula (10), the stirring speeds set in the jar test are converted into the stirring speeds at the real field.

$$F = \frac{1}{2} \times Cd \times A \times \rho \times v^2 \quad (3)$$

$$P = F \times v \quad (4)$$

$$P = \frac{1}{2} \times Cd \times A \times \rho \times v^3 \quad (5)$$

$$G = \sqrt{\frac{P}{\mu \times V}} \quad (6)$$

$$v = \frac{2 \times \pi \times r \times n}{60} \quad (7)$$

$$n = \frac{60}{2 \cdot \pi \cdot r} \times \sqrt[3]{\frac{2 \cdot \gamma \cdot V \cdot G^2}{Cd \cdot A}} \quad (8)$$

$$G = \sqrt{\frac{Cd \cdot A \cdot \rho \left(\frac{2 \cdot \pi \cdot r \cdot n}{60}\right)^3}{2 \cdot \mu \cdot V}} \quad (9)$$

$$t = \frac{V}{Q} \quad (10)$$

Therein, r is a radius of stirring (m); v is a tangential speed of paddle (meter per second, m/sec); P is a required shaft horsepower (HP); V is a volume (cubic meter, m³); ρ is a fluid density (kilogram per cubic meter, kg/m³); γ is a hydrodynamic speed (square meter per second, m²/sec); Cd is an impedance coefficient; μ is a fluid viscosity (kilogram per meter and second, kg/m·sec); A is a blade area (m²); and Q is a flow quantity (cubic meter per day, CMD).

In a state-of-use, the present invention carries out preliminary analysis on the basis of the water conditions (data) and the operating parameters to evaluate the performance of water purification operations and analyze the outlet-water quality of coagulation-related units and to understand the relationship between water purification operating parameters and water quality changes.

Figure 3A:
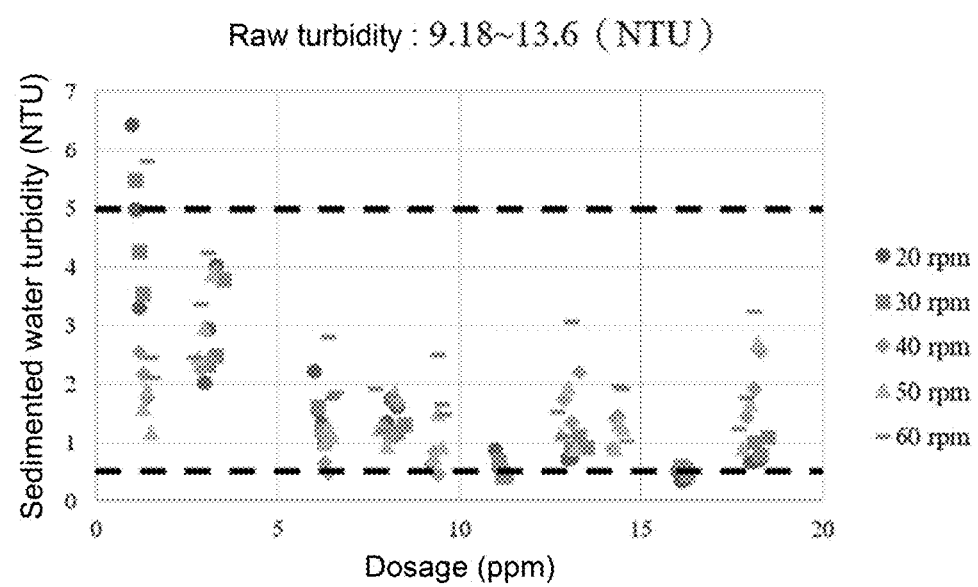
FIG. 3A is the view showing the relationships of the data of the jar test with the first raw turbidity.
Figure 3B:
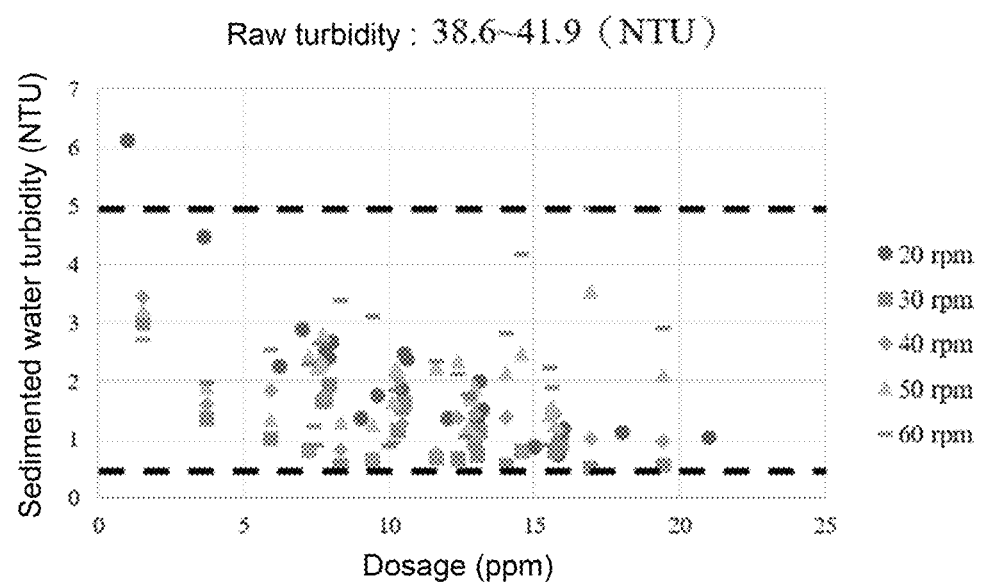
FIG. 3B is the view showing the relationships of the data of the jar test with the second raw turbidity.
Figure 3C:
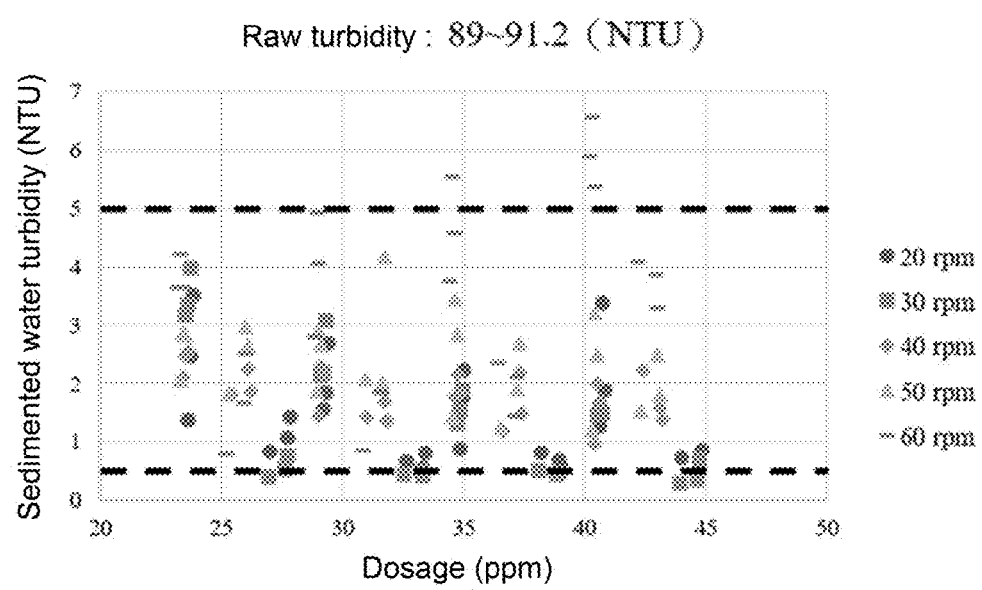
FIG. 3C is the view showing the relationships of the data of the jar test with the third raw turbidity.
Figure 4A:
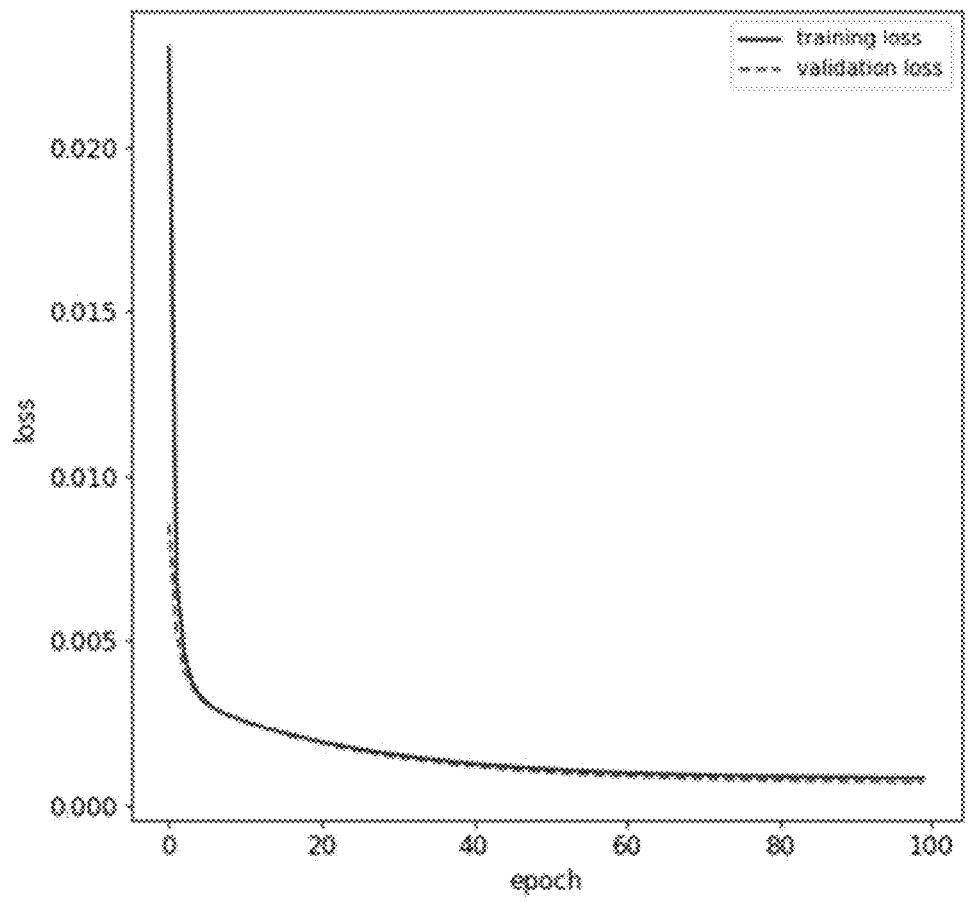
FIG. 4A is the view showing the loss curves of the model of Back Propagation Neural Network (BPNN)
Figure 4B:
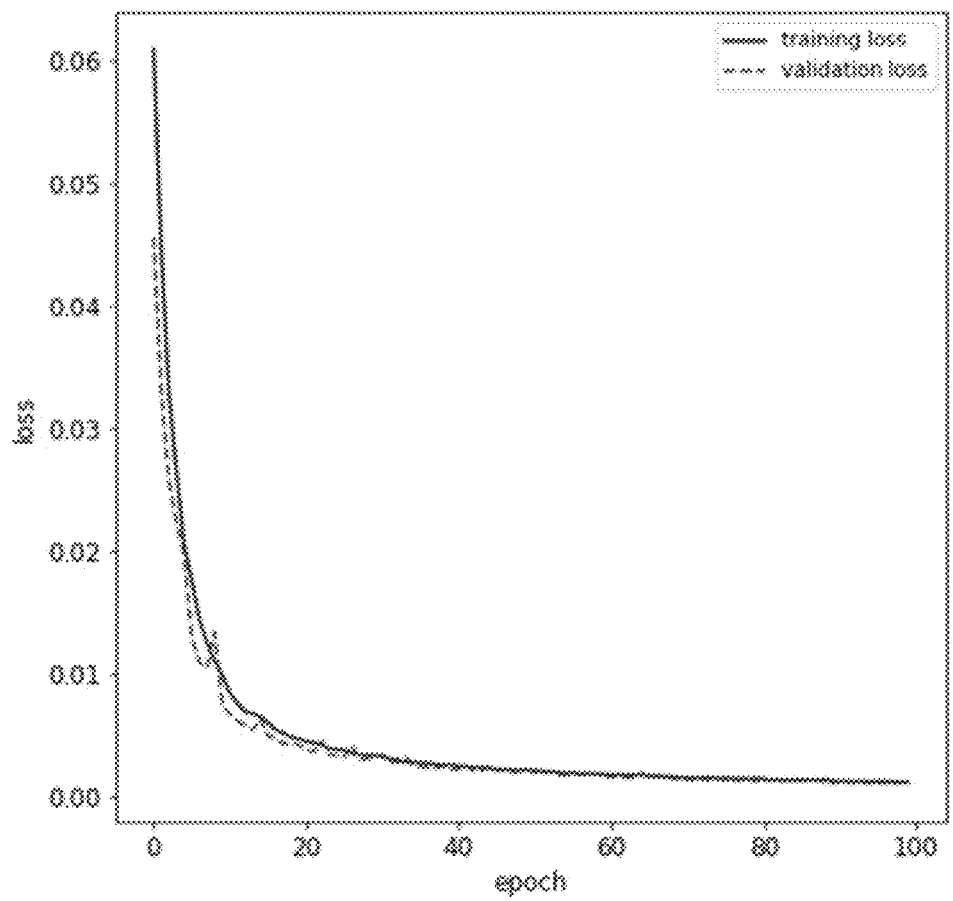
FIG. 4B is the view showing the loss curves of the model of Extreme Learning Machines (ELM)
Figure 4C:
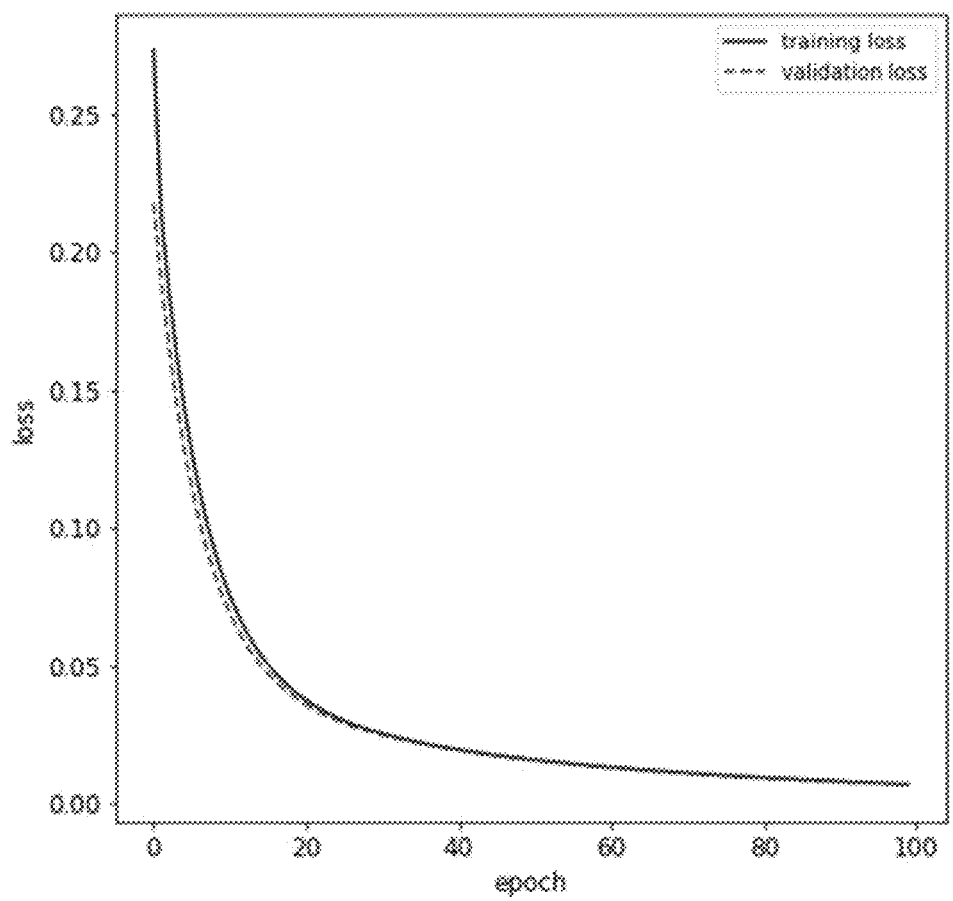
FIG. 4C is the view showing the loss curves of the model of Multiple Linear Regression (MLR)
Figure 4D:
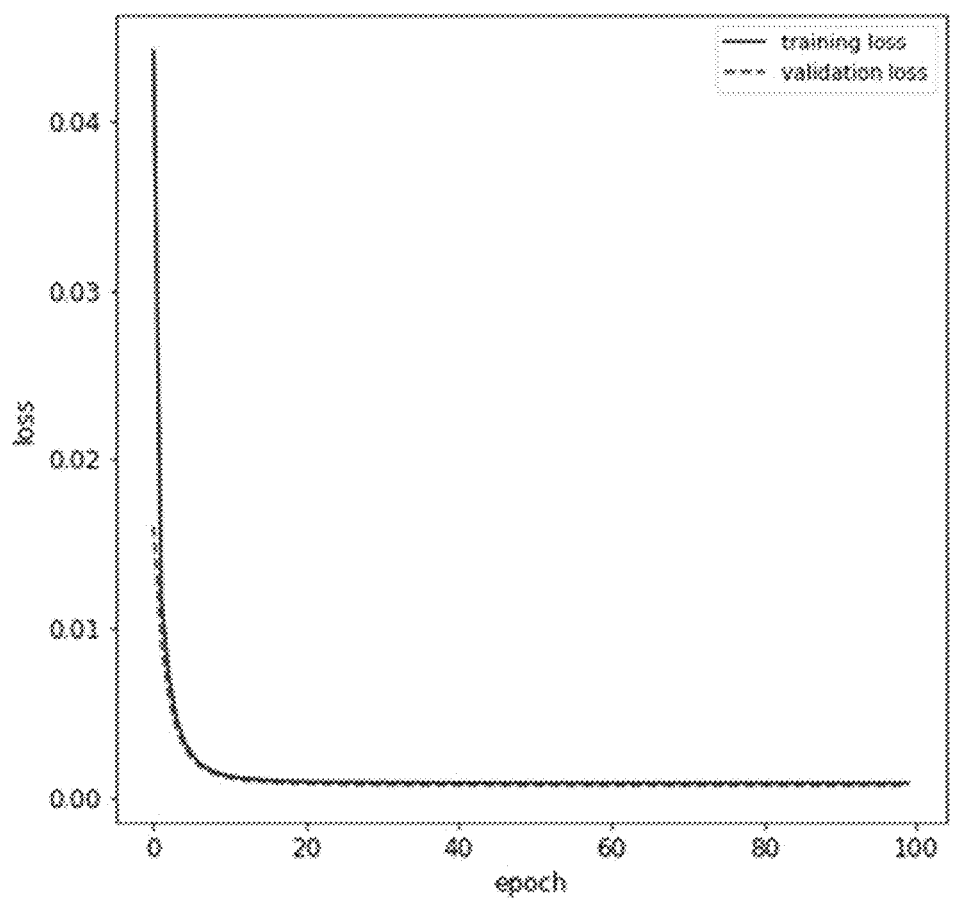
FIG. 4D is the view showing the loss curves of the model of Multiple Nonlinear Regression (MNR)
Figure 5A:
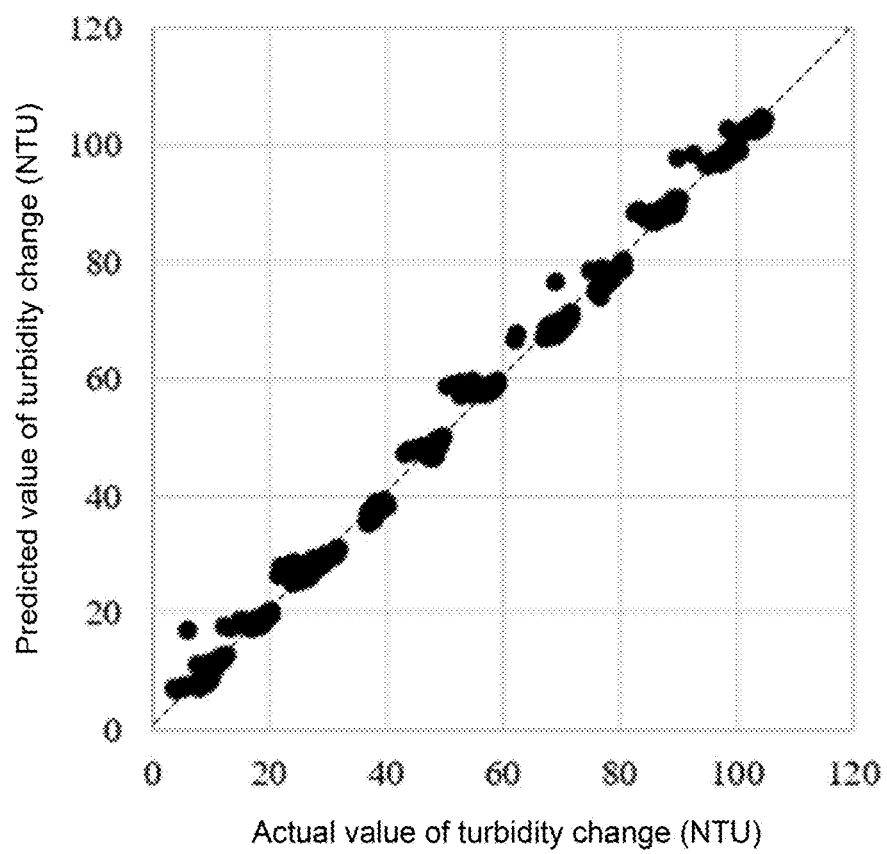
FIG. 5A is the view showing the validation results of BPNN.
Figure 5B:
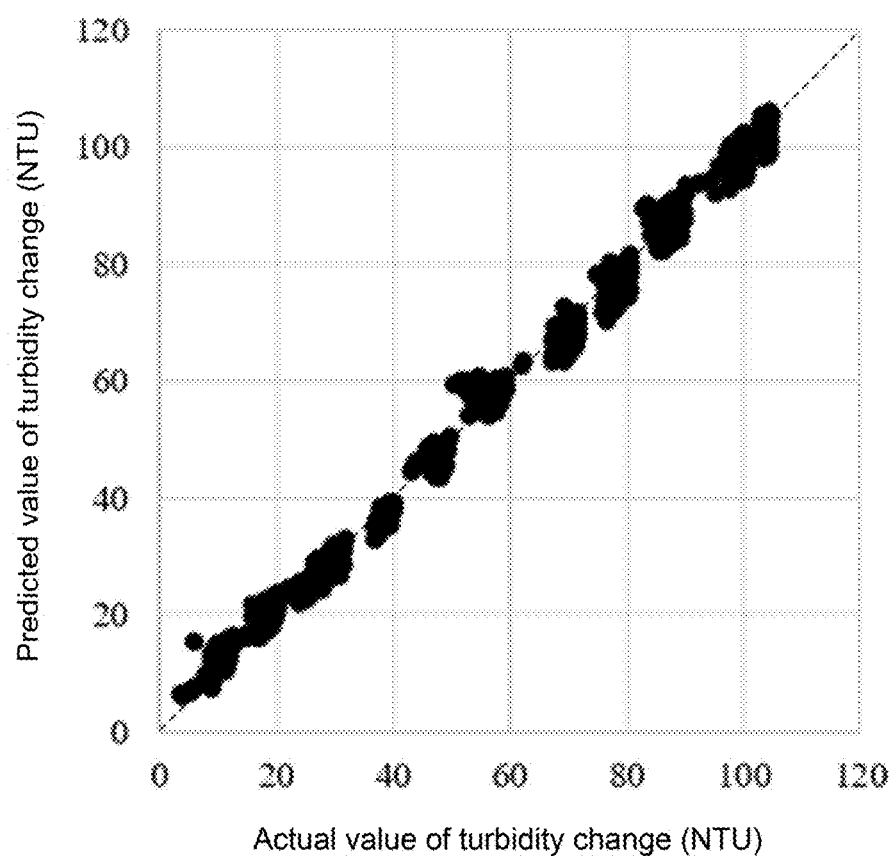
FIG. 5B is the view showing the validation results of ELM.
Figure 5C:
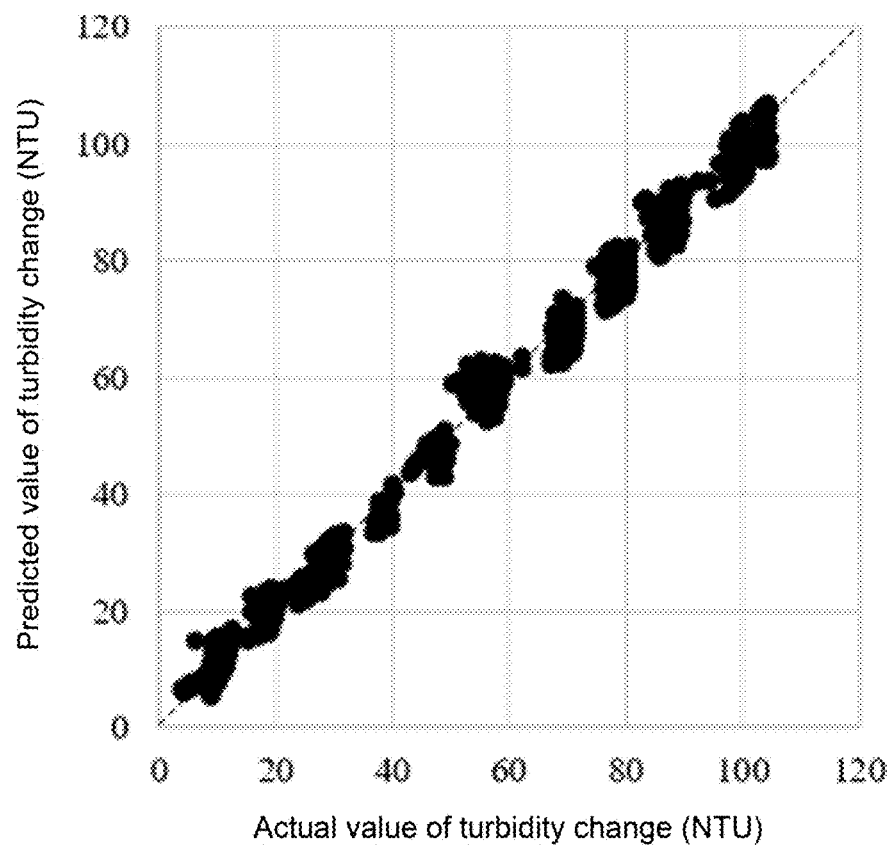
FIG. 5C is the view showing the validation results of MLR.
Figure 5D:
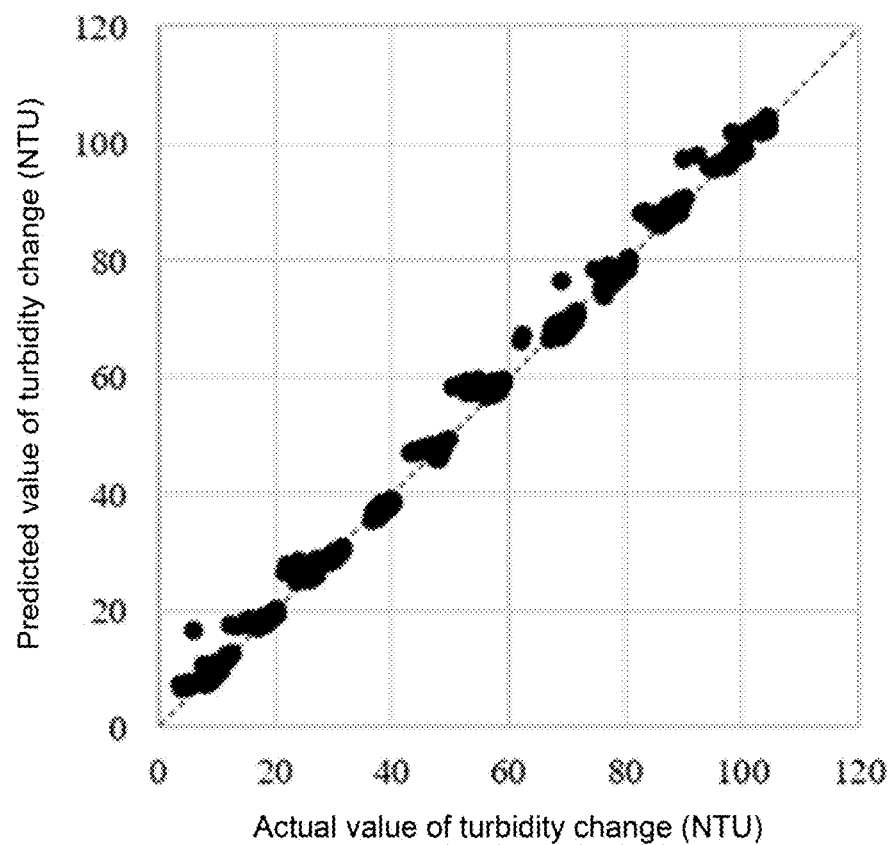
FIG. 5D is the view showing the validation results of MNR.

In FIG. 3A~FIG. 3C, they show, under similar water conditions (a raw turbidity of 9.18~13.6 NTU in FIG. 3A; a raw turbidity of 38.6~41.9 NTU in FIG. 3B; a raw turbidity of 89~91.2 NTU in FIG. 3C), the relationships between coagulant dosage, stirring speed and turbidity change. When the raw turbidity is 9.53 NTU, the coagulant dosage is 16.3 ppm, and the stirring speed for slow mixing is 20 rpm, as shown in FIG. 3A; the raw turbidity is 41.9 NTU, the coagulant dosage is 19.4 ppm, and the stirring speed for slow mixing is 30 rpm, as shown in FIG. 3B; and the raw turbidity is 91.2 NTU, the coagulant dosage is 43.9 ppm, and the stirring speed for slow mixing is 30 rpm, as shown in FIG. 3C, the lowest turbidities are achieved after sedimentation. The results show that, when the stirring speed increases, flocs formed are broken up to make turbidity change less stable. Besides, on high turbidity, if the stirring speed is too slow, it is not conducive to the formation of flocs. Although the operating parameters achieve the best coagulation effect, the present invention aims at meeting the operating specification (with a turbidity of supernatant parts in sediment tank less than 5 NTU shown as the dashed line above in the figure, while the dotted line below is the 0.5 NTU turbidity specification of clear water pool for reference) while finding the operating parameters achieving the lowest cost of both the coagulant and the power consumption of the stirring speed. Therefore, the proposed optimized coagulation procedure must be designed according to this purpose.

Usually, on training, a model is diagnosed according to its training losses and validation losses for expectation of optimizing the trained model, which means to obtain a model with good generalization ability. In a state-of-use, in step (a), the models of ANN and regression comprises Back Propagation Neural Network (BPNN), Extreme Learning Machines (ELM), Multiple Linear Regression (MLR), and Multiple Nonlinear Regression (MNR), as shown in FIG. 4A~FIG. 4D. According to FIG. 4A~FIG. 4D, it is found that the curves of training loss and validation loss of the four models gradually converge at about 20 periods, which achieve good fits.

In a state-of-use, the present invention uses the coagulation data of the jar test as the basis for developing the optimized coagulation procedure. Through the comparison of various methods of ANN and regression, a model is selected to develop with accuracy verified. The verifying method is as follows:

The present invention uses the optimized coagulation procedure to train the relationships between raw quality, coagulant dose, stirring speed and turbidity change. According to the turbidity changes obtained from the jar test as the basis for verifying models, the predicted values of the models are compared. At the same time, the root-mean-square difference (RMSD) and coefficient of determination (Coefficient of determination, $R^2$) are calculated as evaluation indicators for verifying the accuracy of the optimized coagulation procedure.

The following states-of-use are only examples to understand the details and contents of the present invention, but not to limit the scope of patent of the present invention.

[Verification of Optimized Coagulation Procedure]

The coagulation data is collected from Mar. 21, 2022 to May 20, 2022 as summing up to a total of 1200 data records. In order to cover different water conditions in training data, the present invention sections the data according to turbidity and stirring speed for slow mixing (turbidity interval of 10 NTU, speed interval of 10 rpm); and obtains 90% of the same turbidity and speed intervals for model training and testing while the other 10% for model validation.

The input variables are raw turbidity, raw pH, dosage of polyaluminum chloride, dosage of ferric chloride, and stirring speed for slow mixing; and the output variable is turbidity change. The values of RMSD and $R^2$ of model verification are shown in FIG. 5A~FIG. 5D and Table 1, where the smaller the RMSD value, the more accurate the prediction of the model. As the result shows, the algorithms of the four models of BPNN, ELM, MLR, and MNR all have good performance, where the RMSD of the MNR model has a better performance, followed by that of the BPNN model, and a poorer one of the MLR model. It is speculated that the main reason is the complex and non-linear relationships between water qualities and operating parameters, whose relationships are not interpreted simply by linear regression.

TABLE 1

| Model | $R^2$ | RMSD(NTU) |
| --- | --- | --- |
| BPNN | 0.99 | 1.64 |
| ELM | 0.99 | 2.59 |
| MLR | 0.98 | 3.14 |
| MNR | 0.99 | 1.57 |

In overall, the optimized coagulation procedure is to directly observe the relationships between the raw quality, coagulant dosage, stirring speed, and turbidity change in the jar test, where the BPNN and MNR models have better performances.

Conclusion

The present invention uses the models of ANN and regression to develop the optimized coagulation procedure in response to changes in raw quality for predicting appropriate coagulant dosage and stirring speed to improve water purification efficiency and save medical and electrical cost, where, with the assistance of artificial intelligence, the burden on the operators is reduced.

By comparing various models of ANN and regression, the research and development of the most suitable algorithm for optimizing the coagulation procedure are discussed. The result shows that, in the optimized coagulation procedure, the BPNN and MNR models have high accuracy, whose RMSDs are 1.64 NTU and 1.57 NTU, respectively.

The optimized coagulation procedure aims to observe the relationships between raw quality, coagulant dosage, stirring speed and turbidity change in the jar test, where the BPNN and MNR models have higher prediction accuracy. Furthermore, most of the existing documents only focus on judging coagulant dosage automatically; yet, the present invention further evaluates the stirring speed in the optimized coagulation procedure, where more comprehensive considerations of the factors affecting the coagulation efficiency are made to make the overall procedure more complete. In overall, the optimized coagulation procedure obtains good prediction accuracy while saving cost of energy and midical dosage and improving water purification efficiency.

To sum up, the present invention is a method of optimizing recommended coagulation operating parameters for water treatment, where, for saving energy and reducing cost as well as improving water purification efficiency, algorithms of BPNN, ELM, MLR, and MNR are used to design and develop an optimized coagulation procedure; for developing the optimized coagulation procedure with accuracy and suitability, the present invention collects coagulation data of different water conditions and operating parameters through jar test to estimate turbidity change under the different water conditions and operating parameters through ANN and regression models; and, thus, best operating parameters are obtained with coagulant dosage and stirring speed together having the lowest cost on meeting the drinking water standards.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of optimizing recommended coagulation operating parameters for water treatment comprising steps of:
   collecting coagulation data including conditions of water to undergo treatment and coagulation operating parameters via a jar test;
   using said collected coagulation data to train a plurality of models of at least one of an artificial neural network (ANN) and of regression to estimate turbidity changes under different values of conditions of water to undergo treatment and said coagulation operating parameters, wherein said conditions of water to undergo treatment comprise a raw turbidity, a raw pH, and a temperature; and wherein said coagulation operating parameters comprise a coagulant dosage and a stirring speed;
   inputting values of said water conditions of water to undergo treatment, a set value of said coagulant dosage, and a set value of said stirring speed into trained models of ANN and/or regression obtained after being trained in step (a) to estimate a turbidity change and subtract said turbidity change from said raw turbidity;
   predicting a set value of coagulant dosage and a set value of stirring speed both meeting an operating specification and together having a lowest cost are predicted to be best values of said coagulation operating parameters; and
   comparing said models of ANN and/or regression and selecting a recommended model of said coagulation operating parameters from said models of ANN and/or regression.

2. The method according to claim 1, wherein said turbidity change is a difference between said raw turbidity of the water to undergo treatment and a turbidity of sedimented water to undergo treatment.

3. The method according to claim 1, wherein said coagulation data collected in step (a) comprises a plurality of raw turbidities of 10~100 nephelometric turbidity unit (NTU) with an interval of 10 NTU thereof, a plurality of stirring speeds of 20~60 rounds per minute (rpm) with an interval of 10 rpm thereof, and a plurality of coagulant dosages of concentrations of 0.1~50 parts per million (ppm).

4. The method according to claim 1, wherein said jar test comprises the following sub-steps:
- obtaining a plurality of samples of raw water to undergo treatment with different turbidities; measuring conditions of each of said samples of raw water to undergo treatment, comprising said raw turbidities, said raw pHs, and said temperatures; and loading each of said samples of raw water to undergo treatment with said different raw turbidities into a corresponding plurality of beakers;
- (a2) adding a coagulant to each sample;
- (a3) setting a plurality of said stirring speeds of different mixings, comprising fast and slow mixings for each sample;
- (a4) allowing sedimentation to occur for each sample such that sediment flocs to a bottom of each said beaker; and
- (a5) obtaining a plurality of supernatant parts of each sample of sedimented water to undergo treatment to measure and record a turbidity, a pH, and a temperature of each sample of said sedimented water to undergo treatment.

5. The method according to claim 1, wherein said coagulant is polyaluminum chloride together with ferric chloride.

6. The method according to claim 1, wherein said models of ANN and/or regression comprises Back Propagation Neural Network (BPNN), Extreme Learning Machines (ELM), Multiple Linear Regression (MLR), and Multiple Nonlinear Regression (MNR).

7. The method according to claim 1, wherein said inputting the set values of said coagulant dose and of said stirring speed is performed via simulation in an application program; and
- wherein one of said coagulation operating parameters with the lowest cost is approached through adjustment from said set values having lower cost; and
- a converging spacing of said set values is the difference between said set values changed in said adjustment.

8. The method according to claim 1, wherein, after said operating specification is met, a prediction of a spacing of said set values of said coagulant dose and of said stirring speed is obtained, said prediction being selected from a group consisting of:
- a spacing of said set values of said coagulant dose required to be less than 0.1 ppm and
- a spacing of said set values of said stirring speed required to be less than 0.1 rpm, to obtain said best of said coagulation operating parameters.

9. The method according to claim 1, wherein said operating specification is that the turbidity of a supernatant part of each one of said sedimented water to undergo treatment is required to be less than 5 NTU.

* * * * *